UNITED STATES PATENT OFFICE.

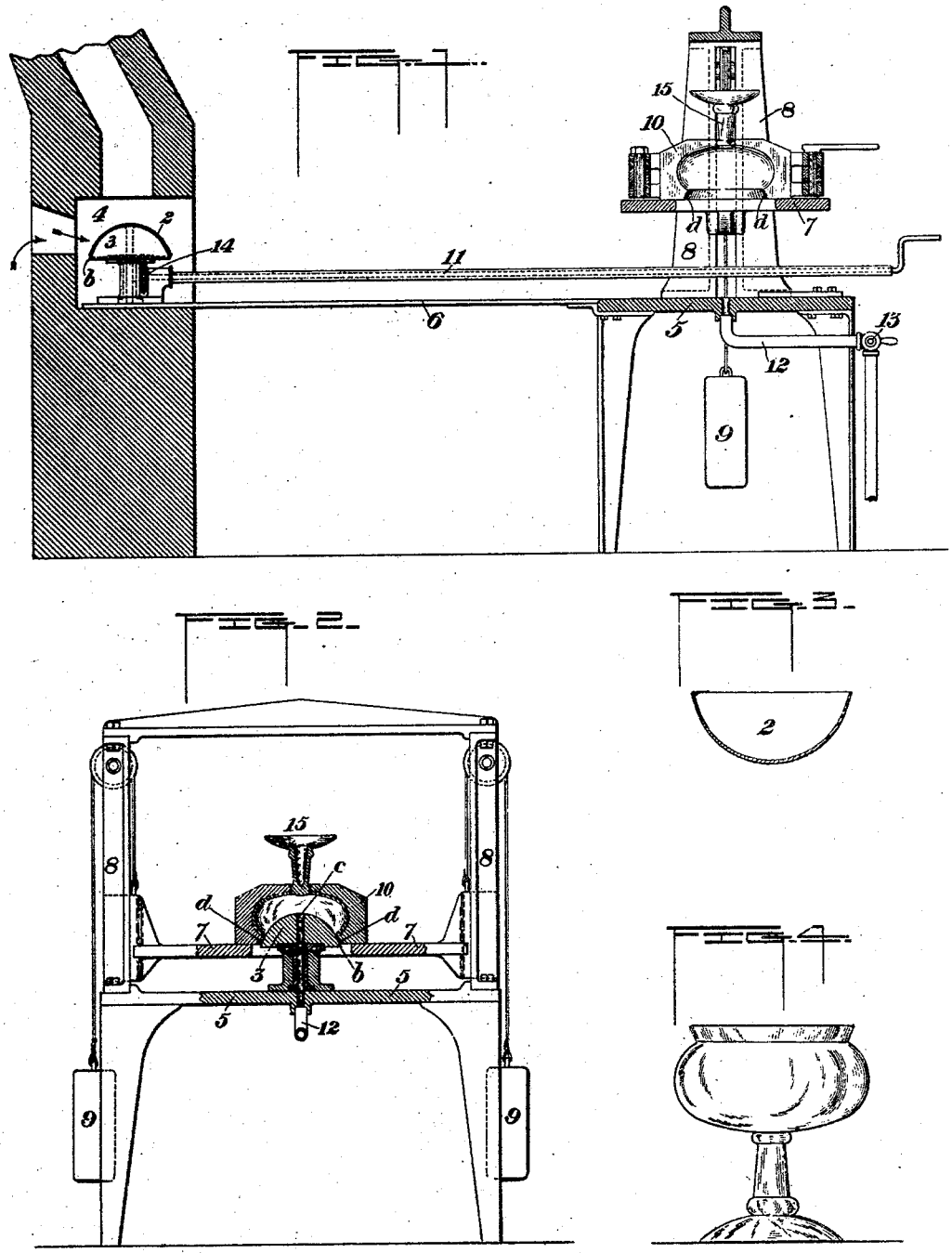

DANIEL C. RIPLEY, OF PITTSBURG, PENNSYLVANIA.

PROCESS OF MANUFACTURING GLASSWARE.

SPECIFICATION forming part of Letters Patent No. 414,586, dated November 5, 1889.

Application filed May 7, 1889. Serial No. 309,943. (No model.)

*To all whom it may concern:*

Be it known that I, DANIEL C. RIPLEY, of Pittsburg, in the county of Allegheny and State of Pennsylvania, have invented a new and useful Improvement in the Process of Manufacturing Glassware, of which the following is a full, clear, and exact description.

My improved method of making glassware is not dependent upon any particular construction of mechanism for its practice; but I have devised certain apparatus especially adapted thereto, and have illustrated the same in the accompanying drawings, to which I shall refer in the course of this specification, premising, however, that the invention is not limited strictly to its use, but may be practiced with apparatus of other forms of construction.

In the drawings, Figure 1 is a vertical sectional view showing in elevation the apparatus which I prefer to use in the practice of my invention. Fig. 2 is a front elevation, partly in section, of part of the apparatus, showing the mold and former in position to shape the glass article. Fig. 3 is an enlarged vertical sectional view of the glass-blank. Fig. 4 is a side elevation showing in outline the finished glass vessel.

Like symbols of reference indicate like parts in each.

The apparatus shown in the drawings is especially adapted to the manufacture of glass vessels or dishes having stems or feet; but it will be understood by the skilled glass-worker that by proper changes in form of the parts articles of various sizes and shapes may be made by the same method.

In the practice of the invention I first form, by pressing in a suitable mold, a cup-shaped blank 2, whose peripheral rim is preferably of the outline or configuration required for the finished article, and then place such blank on a former or support of proper surface size and shape to fit within and to support the blank, and introduce the same into the mouth or glory-hole of a furnace, where it is heated. During the heating of the blank its proper shape is preserved by the former from being destroyed by softening of the glass, and when
it has been sufficiently heated for the subsequent steps of the manufacture the former is withdrawn from the furnace and a ring or mold is placed thereon, so as to confine the blank at the margin, and compressed air is forced through a cavity in the former or support, the effect of which is to blow out or expand the blank at the middle or unconfined portion, while the margin, being confined, is not changed in shape. I prefer to employ as this ring a mold the margin of whose matrix-cavity acts in conjunction with the former or support to clamp and hold the rim of the blank, while the middle portion of the cavity permits the expansion of the glass and determines its exterior shape and pattern when so expanded. It will be understood, however, that the use of such mold, although desirable, is not essential to the practice of my invention.

In the drawings, 3 represents the former or support above mentioned. It consists of a block, preferably cast into the proper form, having a marginal rim $b$ of the diameter and shape of the rim of the glass article to be formed and having extending through it an air-passage $c$.

4 represents the glory-hole of a furnace of usual construction.

5 is the table or frame, which is preferably connected with the glory-hole by a chute or platform 6.

7 is a plate set between upright parallel guides 8 on the table and provided with counterbalancing-weights 9, and 10 is a sectional mold, which is set in an inverted position on the plate above a central cavity therein, the marginal rim $d$ at the end of the matrix being shaped to conform to the marginal rim $b$ on the former or support.

The operation is as follows: I first make, by pressing, a glass blank 2, such as shown in Fig. 3, and place the same on the surface of the former 3, as shown in Fig. 1. I then move the former along the platform 6 by means of a rod or handle 11 into the glory-hole of the furnace, and keep it in the glory-hole until the blank becomes soft and plastic from the heat. To assist in equally heating the blank, the former may conveniently be provided with gearing 14, by which it may be rotated, so as to present all parts of its periphery to the action of the furnace-heat. I then retract the former upon the surface of the table 5 in such position that its air-passage c shall register with the mouth of a pipe 12, which leads from a suitable reservoir of compressed air, and move down the plate 7, so that the rim d of the mold 10 shall fit over the margin of the blank. A valve 13 is then opened, so as to admit compressed air through the passage c in the former, under the blank, and as the edge of the blank is confined tightly between the margins of the former and mold, the air will force the unconfined and plastic middle portion up into the cavity of the mold in which it is shaped. The sections of the mold can then be opened and the finished article removed. When it is desired to form in this way a vessel having a foot or stem, such foot can be separately formed and placed in the mold, so that its end shall project into the interior of the matrix-cavity, as shown at 15 in Fig. 1, and when the blank is expanded, as before explained, it will come into contact with and will be welded to the foot. The rim of the glass vessel so formed may be ornamented with a pattern of any suitable configuration, either by pressing such pattern at the original making of the blank or by forming a pattern on the marginal rim of the mold 10, and thus reproducing it on the blank when the mold is brought down in the act of confining it upon the former.

In making glass articles of other shapes the form of the mold 10 should be changed correspondingly, and, as before explained, the mold may be dispensed with altogether, and a simple ring used to confine the margin of the blank upon the former. The air-blowing mechanism may also be modified in arrangement and location. For example, the handle 11 may be made hollow and used as the air conduit or pipe; and, if desired, instead of using air drawn from a reservoir, the blank may be blown by the workmen, using for that purpose a suitable tube leading to the air-passage in the former.

For forming certain glass articles—for example, long cylindrical vessels—it may be desirable, instead of placing the mold above the former or support and blowing the glass up, as I have described, to invert the apparatus, having the mold-cavity beneath and the former or support above the same. This may be done in various ways, such as will be known by those skilled in the art, preferably by placing the mold on the former in the manner shown in the drawings, then securing these parts together by a suitable catch, and inverting the mold and former together and applying the air from the top of the latter.

The advantages of my invention will be appreciated by those skilled in the art. By means of my improved method I am enabled to form glass articles of uniform size and shape which could not without much greater cost and labor be formed in any other way. The heating of the blank upon the former enables it to be heated to a high temperature and to a high degree of plasticity without distorting it, dispenses with the necessity for handling the glass, and enables articles to be formed in this way even when the width of the marginal rim confined between the mold and former is so narrow that to handle it with a snap without causing it to lose its shape entirely would be practically impossible.

I claim—

1. The method of making glass articles, which consists in forming a glass blank, heating it on a former or support, confining it at the margin, and expanding it by blowing, substantially as and for the purposes described.

2. The method of making glass articles, which consists in forming a glass blank, heating it on a former or support, confining the blank on said former or support, and expanding it by blowing, substantially as and for the purposes described.

3. The method of making glass articles, which consists in forming a glass blank, heating it on a former or support, confining the blank at the margin on said former or support by a suitable mold, and then blowing and expanding it into the mold-cavity, substantially as and for the purposes described.

In testimony whereof I have hereunto set my hand this 26th day of April, 1889.

DANIEL C. RIPLEY.

Witnesses:
W. B. CORWIN,
THOMAS W. BAKEWELL.